F. R. BOLZ.
TIRE SUPPORTING CASE.
APPLICATION FILED JULY 23, 1910.

1,043,752.

Patented Nov. 5, 1912.

WITNESSES:
M. E. Flaherty.
A. D. Cooper.

INVENTOR:
Frank R. Bolz
By
Clarke Raymond & Grace
his attorneys.

UNITED STATES PATENT OFFICE.

FRANK R. BOLZ, OF SOMERVILLE, MASSACHUSETTS.

TIRE-SUPPORTING CASE.

1,043,752.   Specification of Letters Patent.   Patented Nov. 5, 1912.

Application filed July 23, 1910. Serial No. 573,425.

*To all whom it may concern:*

Be it known that I, FRANK R. BOLZ, of Somerville, in the county of Middlesex and State of Massachusetts, a citizen of the United States, have invented a new and useful Improvement in Tire-Supporting Cases, of which the following is a full, clear, and exact description, reference being had to the accompanying drawings, forming a part of this specification, in explaining its nature.

My invention relates to a tire supporting case for automobiles, meaning that kind of case around which one or more spare tires are adapted to be placed, the case providing a receptacle for containing tools or other articles.

The object of my invention is to provide an improved means for securing the case to the automobile and the tire or tires on the case.

My invention can best be seen by reference to the drawings in which—

Figure 1:
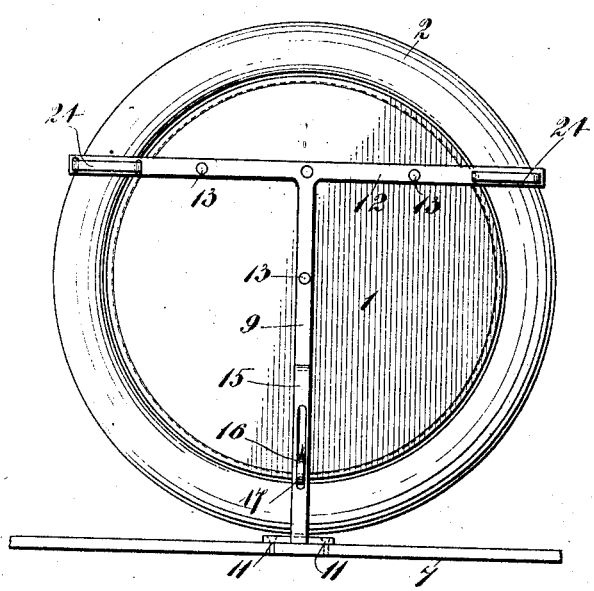
Figure 2:
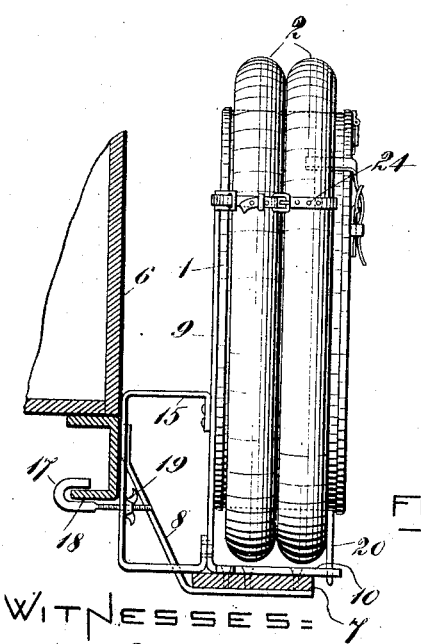
Figure 3:
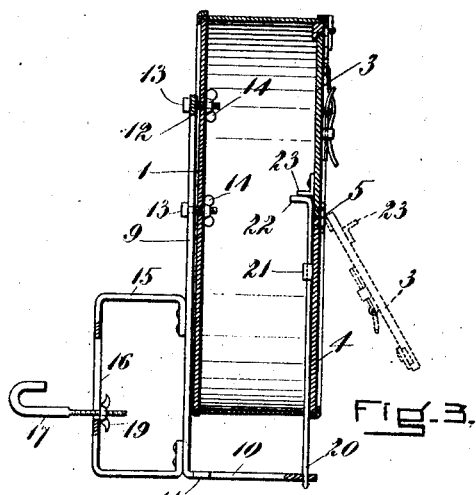

Figure 1 shows in elevation the means comprising my invention applied to the rear face or side of the case. Fig. 2 shows partly in side elevation and partly in section said means applied or affixed to the running board and frame of an automobile. Fig. 3 is a cross vertical section of the case and applied means comprising my invention.

In the drawings:—1 represents the tire supporting case on which are arranged for purposes of illustration tires 2. The case comprises a round or drum-like receptacle or box with flat front and rear sides or faces. Entry is had to the interior of the case by way of a segmental lid 3 secured to the front side 4 of the case by a hinged connection 5.

For the purpose of explaining the means for securing the case to an automobile I have shown a fixture 6 indicating a section of the fore part of the frame of the body of an automobile and also a fixture 7 indicating a section of the running board adjacent the frame 6 and secured thereto by an angle iron 8. This illustrates a construction common in nearly all makes of automobiles.

Referring now to the means comprising my invention, attention is first directed to the upright bar 9 secured to the back of the case and extending downwardly therefrom beyond the bottom peripheral edge thereof where the bar is turned to form a foot 10 extending laterally beneath or alongside the edge of the case and removed therefrom a distance equal to a little more than the thickness of a tire. The foot 10 is preferably provided with lateral flanges 11 which together with the foot act as a supporting base to the upright bar or standard 9 when affixed to the running board of an automobile as may be done in any suitable manner.

Affixed to the upright bar or standard 9 and preferably made integral therewith is a cross-bar 12 extending crosswise the back of the case, and projecting laterally beyond the peripheral edge of the case at either side thereof. I prefer that the bars 9 and 12 be secured to the case in a manner permitting of a ready application of the case to the bars or removal therefrom and a removal also obtainable only when access is had to the interior of the case. Accordingly as shown the respective bars are secured to the case by bolts 13 the threaded shanks of which extend through the back of the case and are secured by winged nuts 14 located inside the case. Assisting in the further support and retention of the upright bar 9 and cross-bar 12, secured to it, is a stay interposed between the bar 9 and the frame of the body of the automobile to which the stay is secured. In practice I prefer to employ a stay consisting of a bent bar 15 secured to the bar 9 at a point near the bottom turned edge thereof and also at a point higher up and which stay when in place extends in part alongside the frame 6 of the body of the machine. In this portion of the bar so extending a slot 16 is formed and arranged to be adjustable in this slot is a hook 17 adapted to catch over an edge portion 18 of the frame 6 and against which it is drawn by a thumb nut 19 arranged on the threaded shank of the hook which projects through the slot in the bar with the nut bearing against the interior side of the bar as the nut is tightened. The slot 16 permits of a considerable range in the adjustment of the hook by which it may be accommodated to different styles or makes of automobiles.

From the construction above described it will be observed that the case is secured or bound to a frame firmly affixed or securable to an automobile, and which frame also has the further adaptation of preventing the tires arranged upon the case from being withdrawn from the rear side thereof inasmuch as the downwardly projecting portion of the bar 9 and the laterally projecting portions of the cross-bar 12 all extending beyond the peripheral edge of the case, act to prevent a withdrawal of the tires. Cooperating with the frame and operating to prevent a withdrawal of the tires from the front side of the case is a sliding bar 20. This bar is arranged to slide through guides 21 affixed to the interior of the front side 4 of the case and extends through the bottom peripheral edge of the case to engage or coöperate with the foot 10 in any suitable manner. I prefer, however, as shown, to so arrange that the bar may be held in place after the sliding extension thereof by a member carried by the lid of the case and which acts to hold the sliding bar in place when the lid is closed. For this purpose the sliding bar is provided with a turned end 22. Fixed to the interior side of the lid 3 of the case is a clip 23 which is adapted to turn in over the end 22 of the sliding bar when the lid is closed, the adaptation of the parts being such also that unless the sliding bar is in a proper position engaging the foot 10 the lid cannot close owing to the interference between the clip 23 and the upper end of the sliding bar.

From the construction described it will be seen that the tire or tires arranged upon the case cannot be withdrawn therefrom either from the back or front until the sliding bar 20 has been lifted or retracted, which operation cannot be effected until access is had to the interior of the case and this by opening the lid 3, which may be kept locked by any suitable means (not shown).

For the purpose of holding the tires securely on the case there is passed or threaded through the laterally projecting ends of the cross-bar 12 straps 24 which are passed around the tires and buckled.

Having thus fully described my invention, I claim and desire to secure by Letters Patent of the United States:—

1. The combination with a tire supporting case, of a frame therefor comprising a base piece securable to the running board of an automobile, a bar projecting upwardly from said base piece and secured to the rear of said case substantially centrally thereof, a cross bar carried by said upwardly projecting bar and having its opposite ends projecting laterally beyond the peripheral edges of said case, and means secured to said upwardly projecting bar for bracing the same.

2. The combination with a tire supporting case, of a supporting frame therefor comprising a base piece securable to the running board of an automobile, a bar extending upwardly from said base piece and secured to the rear side of said case, a bent bar secured at its ends to the rear of said upwardly extending bar and provided intermediate said ends with a longitudinal slot, a hook having a threaded shank passing through said slot, and a nut on said shank engaging the forward face of said last named bar.

3. The combination with a tire supporting case having a movable lid, of locking means contained partly within said case and having a portion extending outside the same beyond the peripheral edge thereof for retaining tires on said case, and means controlled by the position of said lid and engaging the portion of said locking means within said case for retaining the portion of said locking means outside said case in locking position.

4. The combination with a tire supporting case, of a frame for supporting said case and for assisting in the retention of tires thereon, said frame having bars extending beyond the peripheral edges adjacent the rear side thereof, and means coöperating with said frame for retaining tires on said case, the said means comprising a bar inside said case adjacent the front side thereof and slidable to become extended beyond the peripheral edge of said case, and means for retaining said bar when extended as aforesaid.

5. The combination with a tire supporting case, of a supporting frame attached thereto and extending in part beyond the peripheral edge of said case, a sliding bar contained partly inside said case and slidable to extend outside the same beyond the peripheral edge thereof to coöperate with said frame in maintaining tires on said case, and means inside said case for retaining said bar when said bar is extended as aforesaid.

6. The combination with a tire supporting case, of a frame secured to the rear side of said case and extending in part beyond the peripheral edge thereof, said frame being provided with a base, a sliding bar contained partly inside said case and slidable to extend outside the same beyond the peripheral edge thereof to coöperate with said base, guides secured to the interior of the front side of said case through which guides said bar extends, and means inside said case for retaining said bar when said bar is extended as aforesaid.

7. The combination with a tire supporting case of a locking means contained partly within said case and having a portion extending outside the same beyond the peripheral edge thereof for retaining tires on said case, and means inside said case for retaining the portion of said locking means outside said case in locking position.

8. The combination with a tire supporting case having a movable lid forming a part of the front side thereof, of a frame secured to the rear side of said case, said frame extending in part beyond the peripheral edge of said case and thence inturned to form a foot, a sliding bar contained partly within said case and slidable to extend outside the same beyond the peripheral edge thereof to engage said foot, means on the interior of the front side of said case for guiding said bar, and means carried by said lid on the inside thereof to engage said bar when slidably extended to engage said foot as aforesaid for retaining said bar in place when said lid is closed.

9. The combination with a tire supporting case having a movable lid, a sliding bar contained partly within said case and slidable to extend outside the same beyond the peripheral edge thereof for retaining tires arranged thereon, means for supporting said bar from inside said case, and means carried by said lid on the inside thereof to engage said bar when slidably extended as aforesaid for retaining said bar in place when said lid is closed.

10. The combination with a tire supporting case having a movable lid forming a part of the front side thereof, of a frame securable to the running board of an automobile and secured to said case on the rear side thereof for supporting said case, the said frame extending in part beyond the peripheral edge of said case for assisting in the retention of tires thereon, a sliding bar arranged inside said case adjacent the front side thereof and slidable to extend beyond the peripheral edge of said case, and means carried by said lid for retaining said bar inside said case when slidably extended as aforesaid.

FRANK R. BOLZ.

Witnesses:
JOHN E. R. HAYES,
M. E. FLAHERTY.

---

Copies of this patent may be obtained for five cents each, by addressing the "Commissioner of Patents Washington, D. C."